United States Patent [19]

Aro

[11] 3,903,372

[45] Sept. 2, 1975

[54] TIME DIVISION MULTIPLEX CONFERENCING SYSTEM

[75] Inventor: Enn Aro, Westerville, Ohio

[73] Assignee: North Electric Company, Galion, Ohio

[22] Filed: June 5, 1973

[21] Appl. No.: 367,233

[52] U.S. Cl. .......................... 179/18 BC; 179/1 CN

[51] Int. Cl. .......................................... H04m 3/56

[58] Field of Search .. 179/1 CN, 18 BC, 99, 15 AT, 179/15 AL, 37

[56] References Cited

UNITED STATES PATENTS

| | | | |
|---|---|---|---|
| 3,551,600 | 12/1970 | Berch | 179/18 BC |
| 3,617,643 | 11/1971 | Nordquist et al. | 179/18 BC |
| 3,692,947 | 9/1972 | Lewis | 179/18 BC |
| 3,748,394 | 7/1973 | Thomas | 179/18 BC |
| 3,787,630 | 1/1974 | Carbrey | 179/18 BC |

*Primary Examiner*—Kathleen H. Claffy
*Assistant Examiner*—Gerald L. Brigance
*Attorney, Agent, or Firm*—Johnson, Dienner, Emrich & Wagner

[57] ABSTRACT

A telephone conferencing arrangement used in a TDM system providing for any number of conferences with any number of conferees up to a set maximum number; the set maximum number of conferees in any conference being determined by the number of conference highways in the system.

20 Claims, 6 Drawing Figures

TIME DIVISION MULTIPLEX CONFERENCING SYSTEM

BACKGROUND OF THE INVENTION

1. Field of the Invention

This invention relates to a four wire division multiplex telephone switching system having conferencing capability.

2. Description of the Prior Art

The original approach to conferencing in a four wire TDM system was basically the same approach as was used in the electromechanical or space division four wire switching systems, wherein the transmission portion of each conferee speech path was connected to the receiving speech path portion of all other conferees. This, by itself, was an improvement over the earlier two wire systems in which all the connections of the conference were merely bridged one on top of the other, thus allowing everybody to hear everybody else, but resulting in an accompanying loss of power for each additional party in the conference.

However, the provision of a conference connection over a four wire system was not problem free. Being a unidirectional transmission situation, additional technology was needed to control the feedback and howl which resulted from amplification. In addition, the system was such that the conference bridge as established had as many lines associated therewith as there were conferees in a conference. Thus, a five-party conference circuit used five terminals of the system. Such requirement of course reduces the traffic capacity of the system. Further, in such system conferencing is accomplished on a voice frequency basis, the TDM signals being converted to audio signals instead of being added in the form of sample pulses with the resultant requirement for additional conversion equipment.

In a typical system of this type, a conference was established when a conference button was pressed. When called, the first inlet of the conference circuit, which was one of the terminals of the switching matrix, connected the originator to a first conferee. Parties were added to the conference connection as further inlets were called. A separate facility was required for each conference which was established during the same time period. The conference facilities themselves consisted of a conference bridge which permitted interconnection of the conferees to enable the connected conferees to listen to each other, as well as a number of line terminals, supervision circuits, and the like. Each conference facility would handle and use as many terminals of the system as the maximum number of conferees dedicated to such conference facility, but no more than the maximum number for which the bridge was designed. Although the logic for establishing connections to this type of conference arrangement was part of the system, the actual conferencing arrangement, and interconnection of the parties was done outside the system in an analog form on a conference bridge basis.

Such type of TDM conference facility thus in effect consists of a multi-line suscriber connected to the system terminals. Conference facilities of such type in addition to requiring a large amount of equipment, used up lines from the matrix which was necessarily 100% dedicated to the conferencing circuit facilities (even when not in use).

In another example of the prior art, as shown in U.S. Pat. No. 3,527,889 issued to C. B. Nennerfelt on Sept. 8, 1970 and assigned to the present assignee, a conference circuit has a conference switching network external to the normal switching matrix and a pool of conference lines which are enagageable in any number of conferences. The conference lines of the normal switching matrix are connected to the conferencing switching network and form a commune of interest based upon how many parties there are in a conference. Rather than having individual conference bridges, as in the previous example, all the individual conference bridges are tied into the one switchable conferencing network, so that the entire network can be selectively subdivided into individual subconference networks as required by the connection. A still further TDM approach which uses resonant transformer techniques gives conference capability between only three parties, and because it distributes the same sample pulses to two outgoing lines, suffers an attenuation of 3 db. The connection of more than three parties is not practical because of the resultant attenuation.

SUMMARY OF THE INVENTION

The novel TDM system includes a plurality of lines, each of which has an incoming circuit including a holding capacitor which is charged by a sample of the incoming signal on its line once in each frame. The charge is retained during one TDM frame and sampled in as many different time slots of the frame as there are parties in the conference. Each sample is fed to a different one of a plurality of conferencing highways. The signals appearing on each of the conferencing highways in any one time slot are combined in a summing amplifier with all the other signals appearing on all the other conferencing highways during that time slot, and the combined signal is output over an output highway to a single party which is listening in that time slot. An assignment algorithm controls connection of only one party to one highway in each time slot and insures that in any time slot in which any party is listening, all the parties, including the listening party, are connected to all the conference highways so that the entire signal may be summed and transferred to the listening party. This procedure is repeated in each TDM time frame a number of times which is determined by the number of parties in the conference.

It is an object of the present invention to provide a system in which the signal on each of the incoming lines is sampled without disturbing the resonant transfer for any of the circuits.

It is an additional object of the invention to provide a TDM system which includes a plurality of conference highways internal of the system which eliminates the need for dedication of line terminals solely to conference calls, the number of conference highways being determined by the maximum number of parties to be provided in a conference.

It is a further object of the invention to provide a conference arrangement in a TDM system without adding additional line terminals which are dedicated solely to conference call use.

DESCRIPTION OF THE PREFERRED EMBODIMENT

Figure 1:
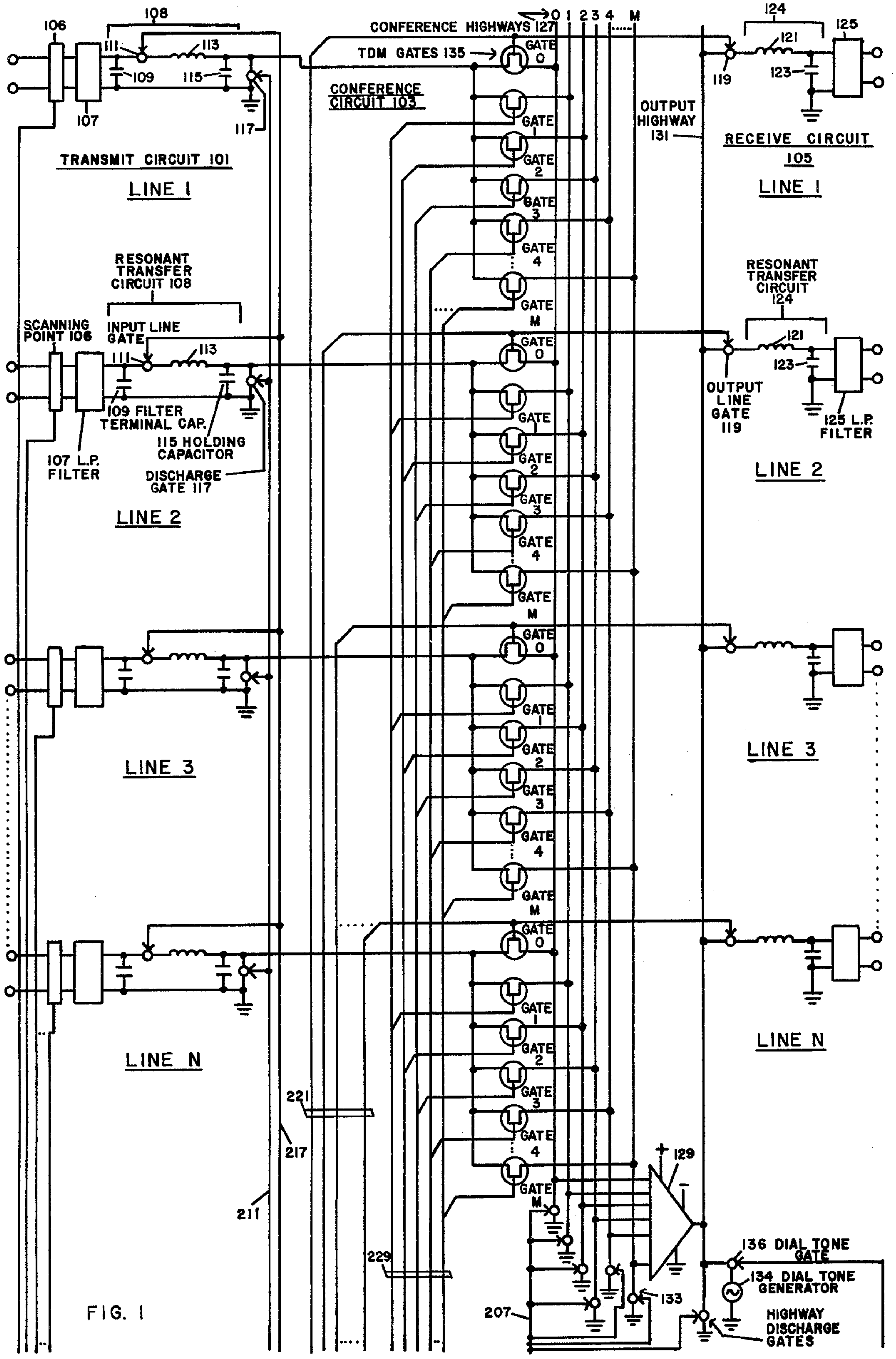
FIG. 1 is a schematic diagram of the preferred embodiment of the present invention.

As shown in the preferred embodiment of FIG. 1, the present invention is an arrangement for conferencing a number of telephone lines on a time division multiplex basis, which lines are indicated as line 1, line 2, line 3, and continuing up to and including line *n*. Each of the lines or terminals consists of a transmit circuit 101 for transmitting signals into a conference circuit 103, and a receive circuit 105 for receiving signals from the conference circuit 103.

The transmit circuit 101 of each of lines 1 to *n*, includes a scanning point 106, an input low pass filter 107 and a resonant transfer circuit 108 consisting of an input filter terminal capacitor 109, an input line gate 111, an input resonant transfer inductor 113 and a holding capacitor 115. An input line discharge gate 117 completes the transmit circuit 101 for each line. Audio signals transmitted by the conferee pass through the low pass filter 107 to the filter terminal capacitor 109. Upon the proper signals from the memory (to be described below) the input line gate 111 closes and by resonant transfer the audio signal on the filter terminal capacitor 109 is transported through the resonant transfer inductor 113 to the holding capacitor 115. From the holding capacitor 115, the signals are fed over the conference highway circuit 103 and to the receive circuit 105 for each line. The receive circuit 105 for each of lines 1 to *n* contains an input line gate 119, and output resonant transfer inductor 121, and an output filter terminal capacitor 123, all part of an output resonant transfer circuit 120 and an output low pass filter 125. With the receipt of a gating signal from the system memory, the output line gate 119 closes, and the signals on the highways of the conferencing circuit 103 are transmitted by resonant transfer through the output resonant transfer inductor 121 to the output filter terminal capacitor 123 and through the low pass filter 125 to the conferee.

The conference circuit 103 consists of a number of conference highways 127, indicated as 0, 1, 2, 3, 4,...*m*. Each of the conference highways 127 are connected to a summing amplifier 129 which, in turn, is connected to a single output highway 131. Each of the conference highways 127 and the output highway 131 has an associated highway 131 has an associated highway discharge gate 133 for discharging it to signal ground when operated. A dial tone generator 134 referenced to signal ground is connected to the output highway 131 through a dial tone gate 136.

Each of the conference highways 127 is connected to the transmit circuit 101 of each of the separate lines 1 to *n* by an individual time division multiplex (TDM) gates 135. These TDM gates are high input impedance gates and in the preferred embodiment described with reference to FIG. 1 are shown as being field effect transistor (FET) gates.

Briefly summarized, in the preferred embodiment there are a total of *n* lines, and a total of *m* highways, with *n* and *m* being used to indicate two different maximum numbers. Since each conference highway 127 is connected to the transmit circuit 101 of each line through a separate TDM gate 135, each of the lines 1 to *n* has associated with it TDM gates 0 to m, each TDM gate 0 to *m* connecting the line to a separate highway 0 to *m*. Conversely, each conference highway 0 to *m* has associated with it a total of *n* gates, one gate for each line in the system.

Operation of all of the gates described above is controlled by gating signals over leads indicated in the 200 series in a manner to be disclosed.

The present TDM system is in effect a pooling arrangement; that is, facilities are not dedicated to each conference. The total traffic capacity of the conferencing arrangement is available to all the parties connected to the system. It is possible to have a multiple number of conferences and as many different conferences as there are unused facilities; and to have different size conferences in any combination up to the maximum number of parties per conference. This maximum number of parties per conference is equal to the number of TDM gates associated with each line 1 to *n*. By operating the gates on each line as many times in the frame as there are parties in the conference, evey party can hear each other party.

To implement the pooling capability of facilities in a TDM fashion, it is not possible to use a resonant transfer approach in the conferencing circuit 103. Since the system works with the original signal energy itself, and since this same signal, on holding capacitor 115, is sampled more than once during a timing frame, resonant transfer within the conferencing circuit 103 would use up the signal energy as it is distributed. By using a high input impedance field effect transistor for TDM gate 135 (instead of a regular analog TDM contact as is used for input and output line gates 117 and 119), the holding capacitor 115 is not loaded and the signal on holding capacitor 115 can be observed without being destroyed. Thus, during operation, when the charge stored in capacitor 115 is observed through the TDM gate 135 and reflected on the highway 127 only a facsimile of its voltage is taken and capacitor 115 is not discharged in the process. Once the capacitor 115 is charged up, the charge will remain on the capacitor, theoretically indefinitely, but at least for the duration of one TDM frame i.e., the time between two consecutive samples on the same line taken via input line gate 111.

The conference highways 127 are connected to the summing amplifier 129. Amplifier 129 is a wideband amplifier with a low output impedance, preferably zero. The summing amplifier integrates the signals on the conference highways 127 and sends the result out over output highway 131.

With the operation of the output line gate 119 for one of the lines 1 to *n*, the summing amplifier 129 charges the output filter terminal capacitor 123 in the output rsonant transfer circuit 120, which capacitor discharges through the low pass filter 125 for audio recovery by that line.

Each of the highways has a discharge gate 133, which gate is operated to remove any change on the highway between the various time slots and thereby eliminate crosstalk.

Figure 2:
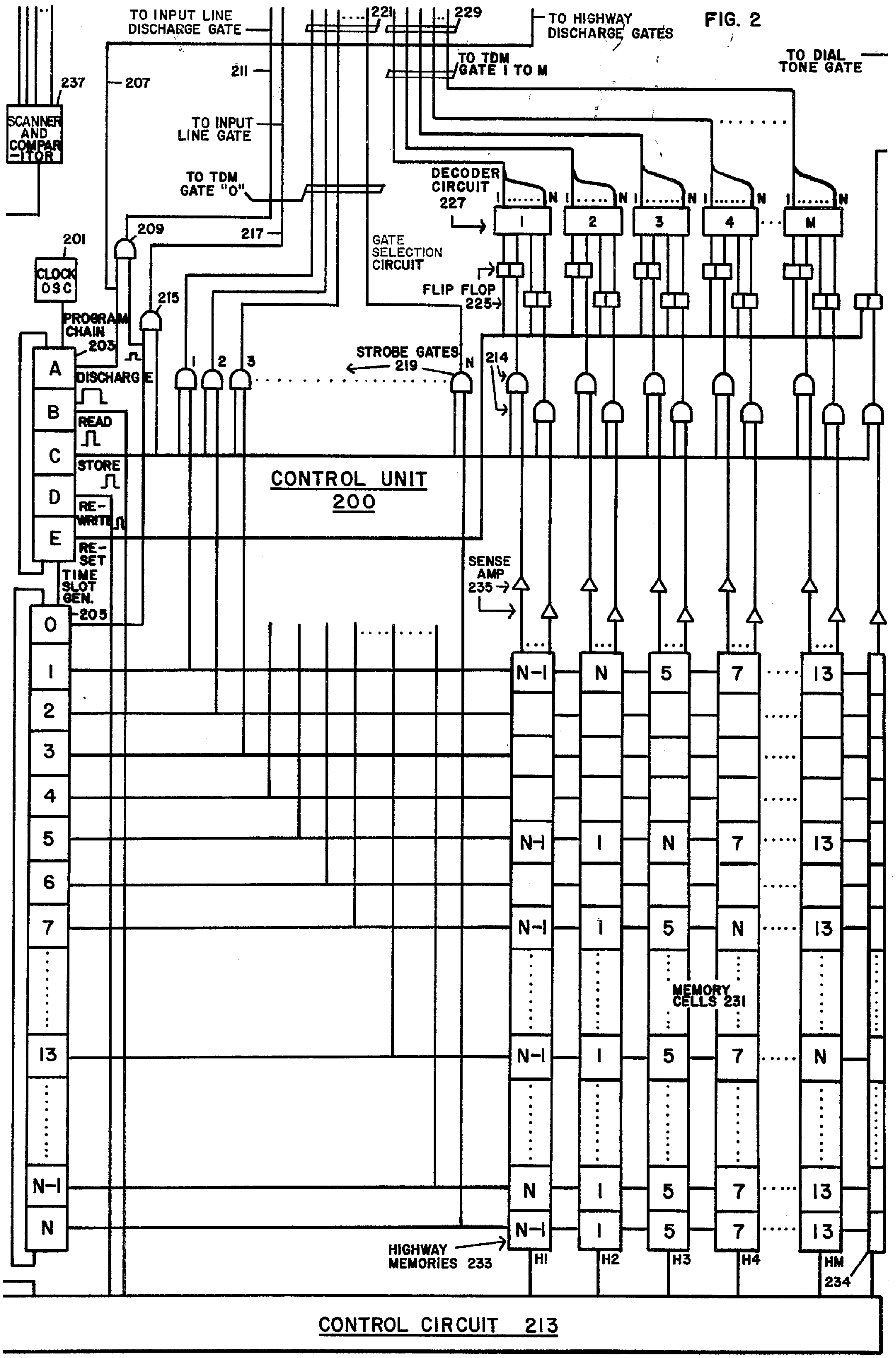
FIG. 2 is a diagram of the control unit used to operte the embodiment of FIG. 1.

As noted above, control unit 200 (FIG. 2) provides gating signals to operate the vaious gates of FIG. 1, and thereby control the operation of the conferencing arrangement. As shown in FIG. 2, the control unit 200 contains clock oscillator 201 which drives a program chain 203 which in turn drives a time slot generator 205.

In the following description of the operation of the program chain, it is first assumed that the oscillator 201 has pulsed the program chain 203 and the time slot generator 205 so that the program chain 203 is pulsing at level A and the time slot generator is pulsing in time slot zero.

The A level of program chain 203 is connected over lead 207 to each of the highway discharge gates 133, and via gate 209 and lead 211 to the input line discharge gates 117 of each of the lines 1 to *n*. The discharge pulse from level A will pulse along lead 207 and operate the highway discharge gates 133, thus discharging all the highways 127 and 131, thereby preventing crosstalk. At the same time, the discharge pulse from level A will combine in gate 209 with the pulse from time slot zero and over lead 211, the combined pulse will operate the input line discharge gates 117, clearing the signal on the holding capacitors 115 of input lines 1 to *n*.

As the next pulse is output by oscillator 201, the program chain 203 switches to level B. The signal output of the B level of program chain 203, containing the memory read pulse, is connected to the control circuit 213.

Operating through control circuit 213, the read pulse output from level B will normally cause a line address for each of the highway memories, to be described below, to be set at the strobe gates 214. Since the control unit is presently operating in time slot zero, and there are no memory cells associated with time slot zero, no line address will be set at strobe gates 214.

With the next pulse output from oscillator 201, program chain 203 is advanced to level C. The signal output of the C level of program chain 203 which comprises a strobe pulse is connected (*a*) via gate 215 and line 217 to the input line gates 111 of each of the lines 1 to *n*; (*b*) via gates 219 (1 to *n*) and leads 221 to the zero TDM gates 135 associated with each of the lines 1 to *n*; and (*c*) via strobe gates 214, flip flops 225, sense and decoder circuits 227, and lead 229 to each of the 1 to *m* TDM gates 135 associated with each of the lines 1 to *n*.

The strobe pulse output from level C will combine in gate 215 with the pulse from time slot zero and the combined pulse output by gate 215 will operate the input line gates 111 allowing the signal on capacitor 109 in each transmit circuit 107 to move by resonant transfer to the associated sample and hold capacitor 115.

It is important to note at this time, that with the time slot generator 205 set at time slot zero, only gates 209 and 215 will operate, gate 209 operating in program chain level A and gate 215 operting in program chain level C. Further, neither gates 214 nor 219 will operate at time slot zero. Conversely, when the time slot generator is in a time slot other than time slot zero, gates 209 and 215 will not operate, and gates 114 and 219 will operate. Summarized, the input line discharge gates 117 and the input line gates 111 operate only in time slot zero (i.e., in program chain levels A and C respectively), and will not operate in the other time slots. Further, address information is read out of the highway memories 237 only in time slots other than time slot zero.

As the oscillator 201 outputs a further pulse, program chain 203 moves down to level D. The pulse output of level D of program chain 203 which contains the memory rewrite pulse is connected to control circuit 213.

In time slots other than time slot zero, after the address information stored in the memory cells 231 has been read out of the highway memories at level C, the pulse at level D, operating through control circuit 213, will normally cause the line address information to be rewritten back into the memory cells 231 of highway memories 233. In this example, however, the time slot generator 205 is at time slot 0, and no address information has been read out. The readout operation is therefore superfluous at this time.

The oscillator clock 201 next advances the program chain 203 to level E. The pulse output from this level will normally reset the flip flops 225, but since time slot generator 205 is set at zero, and no signals have been passed to the flip flops 225, this step is also superfluous at this time.

The oscillator 201 will now cause the program chain 203, set at level E, to recycle itself back to level A and at the same time cause the time slot generator 205 to move to time slot 1. Oscillator clock 201 again drives the program chain 203 through the described cycle but with the time slot generator at time slot 1 significantly different system opeations will occur.

With the program chain 203 set at level A, the highway gates 133 will again discharge the highways 127. However, as pointed out above, since the time slot generator 205 is no longer set at level 0, the input line discharge gates 117 will not operate.

As the program chain 203 advances to level B, and with the time slot generator 205 set at time slot 1, the line address information stored in the memory cells 231 associated with time slot 1, in each of the highway memories 233, will move through sense amplifiers 235 to the inputs of strobe gates 214.

As the program chain 203 moves to level C, the strobe pulse will move the address information at the inputs of gates 214, via flip flops 225 and decoder circuit 227, to operate one of the gates associated with each of the highways in a manner to be more fully described below.

At the same time, the strobe pulse from level C will combine in gate 219 (1) with the pulse from time slot 1, and the resulting pulse will operate the zero gate of line 1. This operation will also be more fully described below.

As the program chain advances to level D, and the address information previously strobed out at program level C at time slot 1 will be rewritten back into the memory cells 231 of the highway memories 233 at the memory location associated with time slot 1.

As the program chain 203 advances to level E flip flops 225 are reset.

In the next cycle of the program chain 203, the time slot generator 205 advances to time slot 2, and the cycle will repeat itself for time slot 2. Cyclic operation of the program chain 203 causes time slot generator 205 to advance through the successive time slots until time slot *n* is reached. Thereafter, when program chain 203 recycles from level E to level A, time slot generator 205 will recycle from level *n* to level 0 and the sequence will start over again.

The time slot generator 205 contains at least as many time slots as there are telephone lines in the system plus an additional zero time slot. In the present embodiment, *n* lines are shown. Time slot 0 of time slot generator 205 is connected through gate 209 and lead 211 to all of the input line discharge gates 117, and through gate 215 and lead 217 to all of the input line gates 111, of each of the lines 1 to *n*. The rest of the time slots 1 to *n* are connected through gates 219 (1 to *n*) to the zero TDM gates 135 associated with each of the lines 1 to *n*. In addition the time slot signals 1 to *n* from time slot generator 205 are also connected to their respective memory cells 231 in each of the highway memories 233, one highway memory of the group **H1-H*m* associated with a corresponding one of the conference highways 1** to *m*, and to the dial tone memory 234 associated with the output highway.

Each of the memory cells 1 to *n*, 231, in the individual highway memories 1 to *m*, 233, besides being connected to the respective time slot signals 1 to *n* of the time slot generator 205, is also connected through a separate sense amplifier 235, associated strobe gate 214, and flip flop 225, to a decoder circuit 227. Each individual decoder circuit 1 to *m*, 227, is tied via leads 229 to the TDM gates 1 to *n*, 135, is associated with an individual conference highway 1 to *m*, 127.

The memory cells 231 of the dial tone memory 234, besides being connected to the respective time slot signals 1 to *n* of time slot generator 205, are all connected together through a sense amplifier 235, strobe gate 214, and flip flop 225 to dial tone generator gate 136 connecting the dial tone generator 134 to output highway 131, FIG. 1.

To complete the control unit 200, a scanner and comparator circuit 237 detects signals picked up by scanning points 106, FIG. 1, associated with each lines 1 to *n*. The scanner and comparator circuit 237 is in turn connected to the control circuit 213 which in turn is connected to the highway memories 233.

At this point reference is made to the difference in system operation by gates 219 and gate 214 respectively, when each are strobed by the C level of the program chain 203.

Each of the gates 219 (1 to *n*) are strobed at the same time, but each gate receives a time slot pulse only in its respective time slot. Therefore, the gates 219 do not operate together, but rather each gate (1 to *n*) will operate in a successive time slot (1 to *n*). Since each of the gates 219 is connected to a separate zero TDM gate 135, associated with a particular line, the zero TDM gate of each line will operate only in the time slot associated with that line.

Similarly, though all gates 214 are strobed at the same time, only those gates, (one for each highway memory 233,) receiving a decoded address pulse from a memory cell 231 associated with a specific time slot, will operate in that time slot. The gates 214 operating in any time slot will transmit the line address information stored in the memory cell 231 associated with that time slot in each highway memory 233, to flip-flops 225, and hence to the decoder circuit 27 associated with that highway memory. Each decoder circuit 227 is connected to all the TDM gates 135 associated with a single highway 127 via separate control lines, each gate 135 connecting the highway to a different line 1 to *n*. The one of the associated gates of a particular highway which the circuit 227 will operate in a specific time slot depends on the line address information stored in the memory cell 231 associated with that time slot, as transmitted by gate 214.

To recapitulate, the zero TDM gate of each line is driven in the time slot coincident with the line number. That is:

TDM gate 0 of line 1 is driven in time slot 1.
TDM gate 0 of line 2 is driven in time slot 2.
TDM gate 0 of line 3 is driven in time slot 3.
TDM gate 0 of line *n* is driven in time slot *n*.

Thus, highway zero is connected in each time slot to the line having the same number as the time slot.

The zero TDM gates of the individual lines are the only TDM gates whoe operation time slot is fixed. All other TDM gates, connecting the other lines in the conference to the various highways, are operated by the highway memories 233 and the operation of these TDM gates is dependent on the logic stored in those highway memories.

The output line gates 119 are driven in the same time slot as the zero TDM gate 135. Therefore, the output line gate 119 of the line 1 is driven in time slot 1, the output line gate 119 of line 2 is driven in time slot 2, etc. Thus, in any time slot, the charge on the sample and hold capacitors 115 of the transmit circuit of the line associated with that time slot will be reflected through the zero TDM gate onto highway zero, through the amplifier 129 onto the output highway 131, and through the output line gate 119 to the receive portion of that line. During any numbered time slot the transmit circuit of the same numbered line is always connected to the receive circuit of that line enabling the party to hear itself. At the same time, the receive circuit of the line is also able to hear all the other conferees in the conference, the other conferees transmitting over the other conference highways.

To demonstrate the conferencing capabilities of the above described system, it will be assumed that the party on line *n* is the originator of a conference between himself and the parties on line *n* — 1, 1, 5, 7, and others, the last conferee being on line 13.

The party on line n, the originator, initiates the conference by first going off hook. The scanning point 106 on his line, line *n*, detects the off hook operation and the scanner and comparator circuit 237 transmits this information to the control circuit 213. The control circuit 213, among its other operations, causes a bit to be set in the memory cell associated with time slot *n* of the dial tone memory 234. Thereafter, in time slot *n*, the dial tone memory 234, operating through its associated sense amplifier 235, strobe gate 214, and flip flop 225, causes dial tone gate 136 to connect dial tone generator 134 to output highway 131. Since the output line gate 119 always operates in its associated time slot, with the bit thus set in dial tone memory 234, the originator receives dial tone. Dial tone continues until the originator dials the first digit of the number of the first conferee. Upon receipt of the first pulse the bit is removed from the memory cell 231 in dial tone memory 234 and dial tone ceases.

The originator continues dialing the number of the first conferee, line *n* — 1. The scanner and comparator circuit 237, operating through the scanning point 106 on his line, line *n*, detects the dial pulse and transferring the information through the control circuit 213, enters the line number of this first conferee, *n* — 1, on the first highway memory 233, in the memory cell 231 associated with the originator's time slot $n$. The control circuit 213 then enters the line number of the originator on the first highway memory 233, in the memory cell 231 associated with the first conferee's time slot $n - 1$.

Ringing signal is sent to the called party and ring-back signal is sent to the originator until the called party answers. (These ring and ring-back circuits are not shown but their operation is similar to that of the dial tone circuits). The off-hook operation of the answering called party is detected by the scanner 237, operating through the scanning point 106 on his line, line $n-1$. The scanner transfers this information to the control circuit 213 which causes these signals to stop.

If the originator wishes to include an additional party in the conference, or if the first party does not answer, the originator flashes his switch hook once. This causes dial tone to be returned to him by the mechanism described above.

The originator on line $n$, then calls the second conferee, line 1. The line number of the second conferee will be detected by comparator circuit 237, and the control circuit 213 will enter the line number of this second conferee, 1, in the second highway memory 233, in the memory cell 231 associated with the originator's time slot $n$. In addition the control circuit will enter the line number of this second conferee, 1, in the second highway memory 233, in the memory cell 231 associated with the first conferee's time slot $n - 1$. Then the control circuit will enter the conference information in the memory cells 231 associated with the second conferee's time slot, 1, (i.e., the line number of the first conferee, $n - 1$, is entered into the memory cell 231 on the first highway, and the line number of the originator, $n$, entered into the memory cell 231 on the second highway).

As before, a ringing signal will be sent to the called party and a ring-back signal will be sent to the originator. The first conferee, $n - 1$, already connected to the originator remains on the line and conversation with the originator is possible while the originator waits for the second conferee to come on the line.

In a similar fashion, the originator can call a third party, such as the party on line 5. The line number, 5, of the third party is entered into the memory cells 231 on the third highway memory 233 in the time slots associated with (*a*) the originator, $n$, (*b*) the first conferee, $n - 1$, and (*c*) the second conferee, 1. Then the conference information is transferred to the memory cells 231 associated with the third conferee's time slot, 5, (*a*) the line address of the first conferee, $n - 1$, being entered on the first highway, (*b*) the line address of the second conferee, 1, being entered on the second highway, (*c*) the line address of the originator being entered on the third highway.

The fourth party, party 7, can be added to the conference in a similar manner. The line address of the fourth party, 7, is placed on the fourth highway memory in the memory cells associated with the time slots of the originator and other conferees; and in the memory cells associated with the fourth conferee, the conference information relative to originator $n$ and conferees $n - 1$, 1 and 5 is placed in the respective highway memories, the line number of the originator being placed on the fourth highway memory.

Other conferees are similarly added to the conference in order until the line number of the last conferee, 13, is entered on the last highway memory in the cells associated with the originator and the other conferees, and the line address of the other parties in the conference are entered in the cells associated with the time slot of the last conferee.

It is important to note that for each party the conference information appears in the memory cells in the order in which the parties were called, the exception being that in any time slot, in the highway memory whose number corresponds with the order number of the party called, the control circuit 213 substitutes the line address of the originator for the line address of the party called.

If at any time a called party does not answer his ringing phone, the originator can stop the ringing and ring-back signals by simply flashing his switch hook once. This will not only stop the ringing and ring-back signals but will also give the originator dial tone. If the originator does not wish to dial another party, he may again operate his switch hook, and the dial tone will cease. He may then proceed to converse with those conferees already in the conference.

With the information thus written into the memory cells of the individual highway memories 233, each highway memory, which is capable of activating all the TDM gates 135 associated with a specific conference highway 127, is able to determine which TDM gate to activate in a particular time slot. It activates that TDM gate, associated with a particular line, whose line address is written into the memory cell 231 in that particular time slot.

With the information described above now written into the memory cells of the highway memories, the operation of the control unit 200 is next described.

It is assumed, for purposes of example, that oscillator 201 has pulsed both the program chain 203 and the time slot generator 205 so that the pulse output from the program chain 203 is at leval B and the pulse output from the time slot generator 205 is at time slot 1. The pulse output from level B causes the address information in the memory cells 231 associated with time slot 1 to appear at the associated strobe gates 214. The clock 203 will then move to strobe pulse level C.

The pulse from level C strobes all of the strobe gates 214. With the time slot generator 205 set at time slot 1:

*a*. Highway memory 233 No. 1, associated with highway H1, having the address of line $n - 1$ in its memory cell 231 associated with time slot 1, activates TDM gate No. 1 for line $n - 1$ connecting line $n - 1$ (not shown) with highway H1.

*b*. Highway memory 233 No. 2, associated with highway H2, having the address of line $n$ in its memory cell 231 associated with time slot 1, activates TDM gate No. 2 of line $n$ thus connecting line $n$ with highway H2.

*c*. Highway memory 233 No. 3, associated with highway H3, having the address of line 5 in its memory cell 231 associated with time slot 1, activates TDM gate No. 3 of line 5 thus connecting line 5 with highway H3.

*d*. Highway memory 233 No. 4, associated with highway H4, having the address of line 7 in its memory cell 231 associated with time slot 1, activates TDM gate 4 of line 7 thus connecting line 7 with highway H4.

*e*. Highway memory No. $m$, the last highway memory, having the address of line 13 in its memory cell associated with time slot 1, activates the last TDM gate ($m$) of line 13 thus connecting line 13 with highway Hm.

In addition the pulse output from program chain 203 at level C and the pulse output from the time slot generator at time slot 1 will combine in gate 219(1) and will pass over associated lead 231 to operate line gate 119 for line 1, thus enabling the party of line 1 to hear lines $n-1$, $n$, 5, 7, and 13 during time slot 1. The same pulse is also fed to TDM gate 0 associated with highway No. 0 whereby the party on line 1 will also hear his own voice.

The program chain on level C advances to level D as noted above rewriting the address information back into the memory cells and then advances to level E to reset the flip flops 225.

The pulse output from level E causes the time slot generator 205 to move to time slot 2, and the program chain to recycle itself back to level A enabling the highway discharge gates 133 to discharge highways 127 and 131. The program chain will again move to level B causing the address information in the memory cells 231 now associated with time slot 2 to appear at the associated strobe gates 214. The chain will then move to strobe pulse level C.

With the program chain 203 at level C, and the time slot generator now at time slot 2, the zero TDM gate associated with highway 0 and the output line gate 119 will be operated for line 2 so line 2 can hear itself. (However since line 2 has not been included in the exemplary connection the connection is not of significance.)

Moving through levels D and E the program chain will again recycle and the time slot generator will move to time slot 3, and after that to time slot 4. In each of these time slots, as in time slot 2, the zero TDM gate for the line associated with that time slot will operate, connecting that lien to the zero highway. Also the output line gate 119 for that highway will operate allowing the line to hear itself. As in the case of line 2, lines 3 and 4 are not in the exemplary conference, and they will not be in conversation with anyone, even though the gates operate. It should be noted however that other lines 2, 3, 4 could be parties to a different simultaneous conference involving other parties.

The program chain will recycle itself back through level A to level B, and the time slot generator will now be at time slot 5. At level B, the address information in the memory cells associated with time slot 5 will appear at the associated strobe gates 214.

The chain advances to level C. With the time slot generator 205 at time slot 5:

*a.* TDM gate No. 1 associated with highway H1 is activated by highway memory No. 1 for line $n-1$.
*b.* TDM gate No. 2 associated with highway H2 is activated by highway memory No. 2 for line 1.
*c.* TDM gate No. 3 associated with highway H3 is activated by highway memory No. 3 for line $n$.
*d.* TDM gate No. 4 associated with highway H4 is activated by highway memory No. 4 for line 7.
*e.* TDM gate No. $m$ associated with highway Hm is activated by highway memory No. 4 for line 13.

In addition both TDM gate No. 0, associated with highway HO, and output line gate 119 of line No. 5 are activated through gate 219 No. 5 thus enabling line 5 to hear itself as well as the other conferees.

The recycling continues and in time slot 6, TDM gate 0 and the output line gate 119 are operated for line 6. In time slot 7,

*a.* TDM gate 1 is operated for line $n-1$.
*b.* TDM gate 2 is operated for line 1.
*c.* TDM gate 3 is operated for line 5.
*d.* TDM gate 4 is operated for line $n$.
*e.* TDM gate $m$ is operated for line 13.
*f.* TDM gate 0 and the output line gate 119 are operated for line 7.

In time slots 8–12, the TDM gates 0 and the output line gates 119 of lines associated with those time slots operate in their individual time slots.

In time slot 13,

*a.* TDM gate 1 is operated for line $n-1$.
*b.* TDM gate 2 is operated for line 1.
*c.* TDM gate 3 is operated for line 5.
*d.* TDM gate 4 is operated for line 7.
*e.* TDM gate $m$ is operated for line $n$.
*f.* TDM gate 0 and the output line gate are operated for line 13.

In time slot 14, 15 and 16, the TDM gate 0 and the output line gates associated with the individual lines operate in their individual time slots.

In time slot $n-1$,

*a.* TDM gate 1 is operated for line $n$.
*b.* TDM gate 2 is operated for line 1.
*c.* TDM gate 3 is operated for line 5.
*d.* TDM gate 4 is operated for line 7.
*e.* TDM gate $m$ is operated for line 13.
*f.* TDM gate 0 and the output line gate are operated for line $n-1$.

In time slot $n$,

*a.* TDM gate 1 is operated for line $n-1$.
*b.* TDM gate 2 is operated for line 1.
*c.* TDM gate 3 is operated for line 5.
*d.* TDM gate 4 is operated for line 7.
*e.* TDM gate $m$ is operated for line 13.
*f.* TDM gate 0 and the output line gate are operated for line $n$.

Therefore, in the above example:

Line 1 will transmit information to the amplifier 129,
during time slot 1 over highway 0,
during time slot 5 over highway 2,
during time slot 7 over highway 2,
during time slot 13 over highway 2,
during time slot $n-1$ over highway 2,
during time slot $n$ over highway 2.
Line 1 will listen only during time slot 1.

Line 5 will transmit information to the amplifier 129,
during time slot 1 over highway 3,
during time slot 5 over highway 0,
during time slot 7 over highway 3,
during time slot 13 over highway 3,
during time slot $n-1$ over highway 3,
during time slot $n$ over highway 3.
Line 5 will listen only during time slot 5.

Line 7 will transmit information to the amplifier 129,
during time slot 1 over highway 4,
during time slot 5 over highway 4,
during time slot 7 over highway 0,
during time slot 13 over highway 4,
during time slot $n-1$ over highway 4,
during time slot $n$ over highway 4.
Line 7 will listen only during time slot 7.

Line 13 will transmit information to the amplifier 129, during time slot 1 over highway *m*,
during time slot 5 over highway *m*,
during time slot 7 over highway *m*,
during time slot 13 over highway 0,
during time slot $n - 1$ over highway *m*,
during time slot *n* over highway *m*.

Line 13 will listen only during time slot 13.

Line $n - 1$ will transmit information to the amplifier 129, during time slot 1 over highway 1,
during time slot 5 over highway 1,
during time slot 7 over highway 1,
during time slot 13 over highway 1,
during time slot $n - 1$ over highway 0,
during time slot *n* over highway 1.

Line $n - l$ will listen only during time slot $n - 1$.

Line *n*, the originator, will transmit information to the amplifier 129, during time slot 1 over highway 2 during time slot 5 over highway 3,
during time slot 7 over highway 4,
during time slot 13 over highway *m*,
during time slot $n - 1$ over highway 1,
during time slot *n* over highway 0.

Line *n* will listen only during time slot *n*.

Thus, it can be seen that there is only one signal on one highway during any one time slot, that is, one signal per time slot per highway. The time slot assignment algorithm makes sure that only one party is connected to one highway in one time slot.

The signals appearing on all the highways in any time slot are summed in the summing amplifier preventing interaction between signals, and the combined signal is fed to the party who is listening in that time slot.

Thus, in the present example, if five parties are in conference, in one time slot the amplifier sums the five signals appearing on the five highways. That is, five parties of one conference will be talking to one of the five parties in that time slot.

In each time slot, a different listener hears the total conversation of the five parties. Each conversation is repeated five times in a timing frame.

As pointed out above, the ability of each party to transmit during each required time slot is possible because the TDM gate does not load the sample and hold circuit so that the charge remains the same throughout the frame, no matter how often it is sampled.

The summing amplifier 129 must have a very low impedance on its output side and on its input side must be matched to the combined output characteristics of all the TDM contacts associated with an individual highway. Additionally, as pointed out above, the amplifier must be wideband so that it will not retain any signal between the times when the highways are discharged. This is important because a number of separate conferences could be going on at the same time on separate time slots and the conferees in different conferences may be in contiguous time slots. Since the amplifier operates in each time slot, it must not retain signals between time slots. This assures that every party is listening only in a time slot associated with his conference.

As an example of three simultaneous conferences, the following chart is provided wherein:

1. The originator can have a conference with a maximum of five conferees, and
2. There are a maximum of eighteen lines in the system, and where,

*a*. Party 18 is the originator of a conference call to parties 17, 1, 5, 7, and 13, as in the above example.
*b*. Party 16 is the originator of a conference call to parties 4, 12, 6, 14, and 10, and
*c*. Party 11 is the originator of a conference call to parties 9, 13, 15, 2, and 8.

| Time Slot/ Line | Highway 0 | Highway Memories 1 | 2 | 3 | 4 | 5 |
|---|---|---|---|---|---|---|
| 1 | 1 | 17 | 18 | 5 | 7 | 13 |
| 2 | 2 | 9 | 3 | 15 | 11 | 8 |
| 3 | 3 | 9 | 11 | 15 | 2 | 8 |
| 4 | 4 | 16 | 12 | 6 | 14 | 10 |
| 5 | 5 | 17 | 1 | 18 | 7 | 13 |
| 6 | 6 | 4 | 12 | 16 | 14 | 10 |
| 7 | 7 | 17 | 1 | 5 | 18 | 13 |
| 8 | 8 | 9 | 3 | 15 | 2 | 11 |
| 9 | 9 | 11 | 3 | 15 | 2 | 8 |
| 10 | 10 | 4 | 12 | 6 | 14 | 16 |
| *11 | 11 | 9 | 3 | 15 | 2 | 8 |
| 12 | 12 | 4 | 16 | 6 | 14 | 10 |
| 13 | 13 | 17 | 1 | 5 | 7 | 18 |
| 14 | 14 | 4 | 12 | 6 | 16 | 10 |
| 15 | 15 | 9 | 3 | 11 | 2 | 8 |
| *16 | 16 | 4 | 12 | 6 | 14 | 10 |
| 17 | 17 | 18 | 1 | 5 | 7 | 13 |
| *18 | 18 | 17 | 1 | 5 | 7 | 13 |

*Originator

The above chart shows the line address that would be entered into the memory cells 231 for each of the highway memories 233, indicating which TDM gate for the highway associated with that highway memory is to be operated. The chart also shows that the TDM gates for highway 0 are operated in their respective time slot.

An alternate algorithm to the algorithm described above would place the line address of the lines 1 to *n* into the memory cells of the highway memories in a cyclic pattern. An example of this cyclic algorithm is shown in FIG. 3 where the various parties to the conference are designated as follows: P0 is the originator, P1 is the first conferee, P2 is the second conferee, P3 is the third conferee, p4 is the fourth conferee, etc. (Although the time slots of consecutive conferees are also shown consecutively, it will be understood that this need not be the case, and that the time slots of the various parties in the conference can be randomly distributed throughout the timing frame).

Figures 3A, 3B, 3C, 3D:
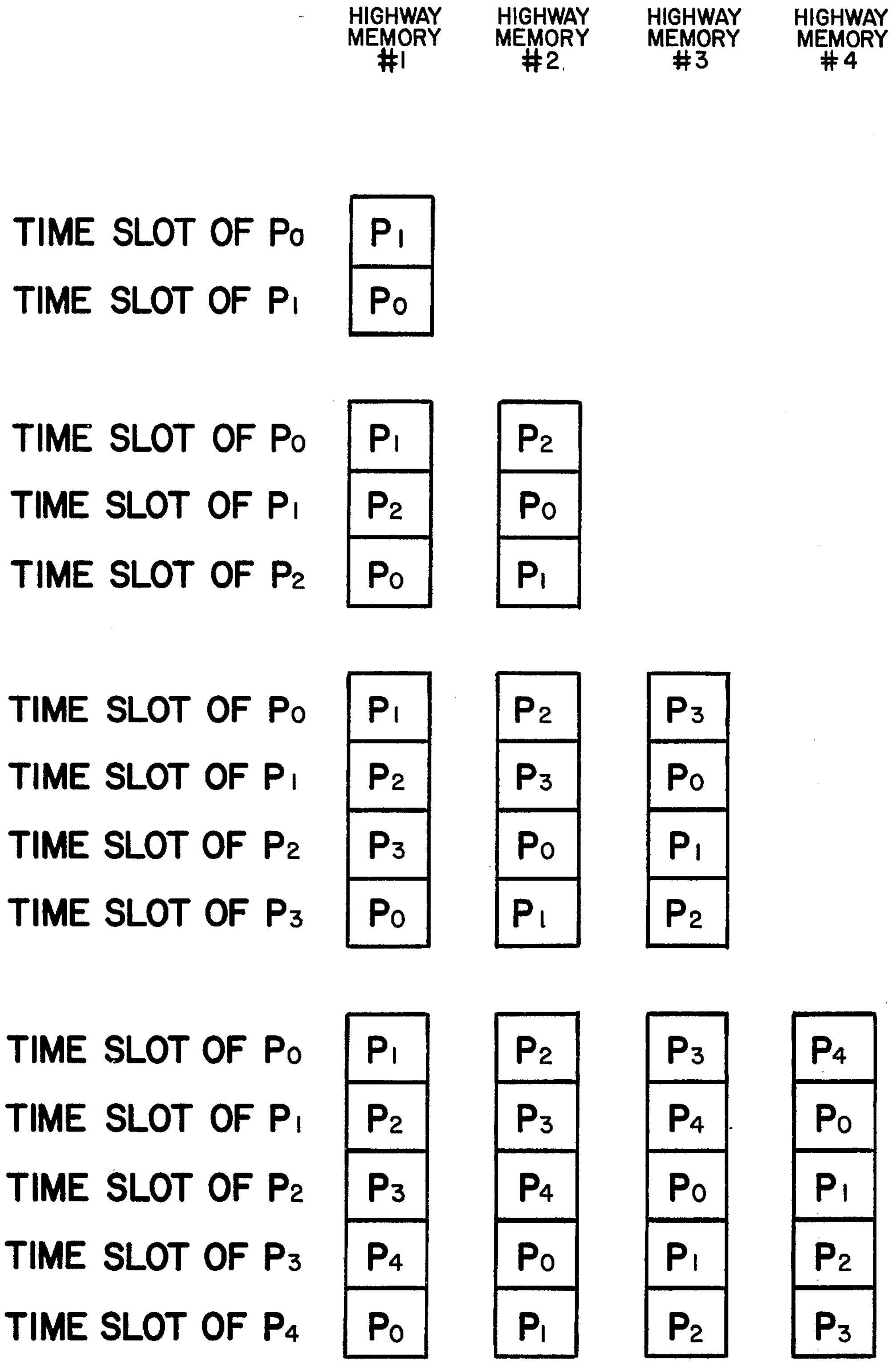
FIGS. 3*a*–3*d* are diagrams of an alternate algorithm which may be used in the control unit of FIG. 2.

As in the above example, when the originator P0 dials the number of the first conferee P1, the line address of the first conferee P1 is placed in the memory cell of the first highway memory associated with the time slot of the originator, and the line address of the originator P0 is placed in the memory cell of the first highway memory for the time slot of the first conferee, see FIG. 3*a*.

When the second conferee is called, the line address of the first conferee P1 remains in the memory cell of the first highway memory associated with the time slot of the originator, while the line address of the second conferee P2 is placed in the memory cell of the second highway. In addition, the line address of the second conferee is also placed in the time slot of the first conferee, but as shown in FIG. 3*b*, the line address of the second conferee is placed in the memory cell of the first highway memory. In addition, the line address of the originator is moved over to the second highway memory in the time slot of the first conferee. The conference information is transferred to the time slot of the second conferee, the line address of the originator P0 being placed in the memory cell of the first highway memory, and the line address of the first conferee P1 being placed in the memory cell of the second highway memory.

When a third conferee is added to the conference, as before, the line address of the first two conferees remain in the memory cells of the first two highway memories associated with the time slot of the originator, while the line address of the third conferee is placed in the memory cell of the third highway memory, see FIG. 3*c*. In addition the line address of the third conferee is also placed in the time slot of the first and second conferees. However, as shown in FIG. 3*c*, in each of these time slots the line address of the originator has been moved over to the next highway memory so that the line address of the new conferee can be placed after the line address of the preceding conferee. Naturally when the line address of the originator is moved, the line address of the conferees is subsequent highway memories must also be moved. Thus, as shown in FIG. 3*c*, the line address of the second conferee P2 remains in the memory cell of the first highway memory associated with the time slot of the first conferee; the line address of the third conferee P3 is placed in the memory cell of the second highway meoory, the line address of the originator P0 being moved over to the memory cell of the third highway memory. The line address of the third conferee P3 is placed in the time slot of the second conferee in the memory cell of the first highway memory, the line address of the originator P0 being moved over to the memory cell of the second highway memory, and the line address of the first conferee P1 being moved over to the memory cell of the third highway memory.

The conference information is transferred to the time slot of the third conferee, the line address of the originator P0 being placed in the memory cell of the first highway memory, the line address of the first conferee P1 being placed in the memory cell of the second highway memory, the line address of the second conferee p2 being placed in the third highway memory.

A similar procedure occurs when a fourth conferee is added to the conference, see FIG. 3*d*. With reference to the time slot of the originator, it is seen that the line addresses of the first three conferees remain in the memory cells of the first three highways, while the line address of the fourth highway is placed in the memory cell of the fourth highway. With reference to the time slot of the second conferee, it is seen that the line address of the second and third conferee remain in the memory cells of the first and second highway memory, and the line address of the fourth conferee has been placed in the memory cell of the third highway memory, and the line address of the originator has been moved over to the memory cell of the fourth highway memory. With reference to the time slot of the second conferee, the line address of the third conferee remains in the memory cell of the first highway memory; the line address of the fourth conferee has been placed in the memory cell of the second highway memory, the line address of the originator has been moved over to the memory cell of the third highway memory, and the line address of the first conferee has been moved over to the memory cell of the fourth highway memory. Similarly in the time slot of the third conferee, the line address of the fourth conferee is placed in the memory cell of the first highway memory, the line address of the originator being moved to the memory cell of the second highway memory, the line address of the first conferee being moved to the memory cell of the third highway memory, the line address of the second conferee being moved to the memory cell of the fourth highway memory.

The conference information is transferred to the time slot of the fourth conferee, the line address of the originator, first, second, and third conferee being placed in the memory cells of the first, second, third, and fourth highway memories respectively.

Additional conferees can be added in a similar fashion.

In the present embodiment, each line was assigned a fixed time slot; besides the zero time slot there were at least as many time slots as there was lines. A more complicated algorithm would permit the lines to use randomly assigned time slots thus allowing the sytem to have more lines than there are time slots in the system. This type of a modification of the preferred embodiment would only be applicable in a system with a low traffic density.

It will be understood that the present embodiment is not limited to voice conferencing but can be used for combining other types of signals as well. It could be used for data conferencing such as teletypewriter information broadcasting, or inquiry broadcasting to selected sets of response units in a computorized information retrieval network.

I claim:

1. In a TDM telephone switching system in which a frame of time slots is cyclically generated, a plurality of conference terminals, each of which includes a transmit and receive circuit, each transmit circuit including means for sampling the signals appearing at each terminal during one time slot of a frame, means for storing the sampled signals, an output highway, gating means for each terminal operative to connect its associated terminal to said output highway only during a predetermined time slot assigned to its terminal, a plurality of conference highways, gate means for selectively connecting a sample of the stored signal on each terminal of said conference highways, memory means for storing the identity of the conference terminals of said plurality which are to be included in a conference call, and control means operative with said memory means during the ones of the time slots which are preassigned to the ones of the conferees identified in said memory means to enable selected ones of said gate means to connect the sampled signal of each of said identified terminals to a different one of said conference highways.

2. A system as set forth in claim 1 in which said memory means include a plurality of groups of memory cells, each group having a series of memory cells, each of which memory cells of a series is connected for use with a different conference highway, and in which said gate means for a terminal is operated by said control means and said memory means to connect the terminal to the one of the conference highways which is associated with the memory cell in which the identity of the terminal is stored.

3. A system as set forth in claim 2 in which each group of memory cells is associated with a different one of said terminals and in which the first cell of said memory cells in each group associated with a terminal in a conference call other than the first called terminal is operative to store the identity of the first called terminal in such conference, and in which the first memory cell of the group for said first called terminal stores the identity of the originating terminal, whereby the first called terminal is connected to the highway associated with the first memory cell in each of the time slots assigned to the parties in the conference call other than its own assigned time slot.

4. A system as set forth in claim 1 in which each of said circuits includes a holding capacitor for storing signals input over its associated terminal, and in which each of said gate means comprises a high impedance field effect transistor switch.

5. In a TDM telephone switching system in which a frame of time slots in cyclically generated, a plurality of conference terminals, a plurality of conference highways, at least one output highway, a plurality of gate means for each of said conference terminals, each of which gate means is operative to connect its associated terminal to a different one of said conference highways, a plurality of time slot gates, each of which is connected to enable a first one of said gate means for a different one of said terminals, means for enabling each of said time slot gates in a different preassigned time slot of said frame, and a plurality of gate selection means, each of which is operative to selectively enable one of said gate means for an identified terminal to connect its associated terminal to a predetermined one of said conference highways, and memory means including groups of memory cells, each of which memory cells in a group is operative to store the identity of a terminal to be included in a call, means for effecting readout of each of said groups of memory cells in a different time slot, and means connecting the identity of a terminal as read out of each memory cell in a group to a different one of said gate selection means.

6. A system as set forth in claim 5 which includes means for connecting the output of each gate selection means to a corresponding one of the gate means in each of said plurality of gate means.

7. A system as set forth in claim 5 in which the number of gate means in said plurality of gate means for each conference terminal is the same as the number of conference highways.

8. A system as set forth in claim 5 in which the number of conference highways is the same as the number of memory cells in each group of memory cells in said memory means.

9. A system as set forth in claim 5 in which the number of time slots in the system is the same as the number of conference terminals, and in which each conference terminal has a different time slot preassigned thereto.

10. A system as set forth in claim 5 which includes means for connecting the output of the first one of said gate means for each terminal to a predetermined one of said conference highways, whereby each of said terminals in a conference is connected to said predetermined conference highway during a different time slot.

11. A system as set forth in claim 10 in which each of said conference terminals includes a transmit and a receive circuit, and each receive circuit includes a further gate for connecting its terminal to said output highway, and in which said time slot gate means operates said further gate for a terminal simultaneously with said first one of said gate means, whereby the transmit and receive circuits of each terminal connected in a conference call are connected over said predetermined conference and output highway during the time slot assigned to such terminal.

12. A system as set forth in claim 5 in whcih each of said conference terminals includes at least one line over which input signals are received, a transmit circuit including sampling means for sampling said input signals which appear on said line for a brief interval in at least one time slot of each frame, and capacitor means for storing said sample, and means for connecting each of said gate means for each terminal to gate the signal on the capacitor means for its terminal to a different conference highway.

13. A system as set forth in claim 12 which includes program means which provides a first signal in said one time slot to discharge the sample stored by said capacitor means, and a second signal in said time slot for operating said sampling means.

14. A system as set forth in claim 13 in which said program means is operative to successively enable each of said gate selection means in each time slot other than said first time slot, the gate means for the terminals in a conference call being enabled by said gate selection means during each such other time slot.

15. A system as set forth in claim 14 in which said gate selection means comprises a plurality of decoder circuits, means connecting each decoder circuit to decode the signal output of a different memory cell in each group of memory cells, and means connecting the output of each decoder circuit to a corresponding one of the gate means in the plurality of gate means for each terminal.

16. A system as set forth in claim 5 which includes a low impedance summing amplifier connected to the output of said conference highways, and a receive circuit connected to said output highway.

17. The method of implementing a conference call between selected terminals of a TDM conferencing system having conference highways, each of which terminals includes a transmit and a receive circuit, said method comprising the steps of preassigning a different time slot to each terminal, sampling the signal on each terminal, storing the sampled signal, connecting a sample of the stored signals from a transmit circuit of each terminal to a correspondingly difference conference highway during each of the time slots which are assigned to the terminals included in the conference call, connecting the signals which appear on each of said conference highway means during each time slot to an output highway, and connecting a receive circuit of a conference terminal to the output highway only during the time slot of the frame which is assigned to such conference terminal, whereby each conference line receives a sampled signal from all of the other terminals in the conference only during its assigned time slot.

18. A method of establishing a conference call between the terminals of conferees in a TDM conference system comprising the steps of assigning each terminal for connection to one of a plurality of conference highways in its own discrete time slot, storing information as to the identity of each terminal to be included in a conference call in a predetermined group of memory cells associated with the assigned time slot for the terminal of the originating conferee, storing the information as to the identity of each conferee for such call in a different group of memory cells respectively associated with the assigned time slots for the terminals of each of the other conferees chosen by said originating conferee in a pattern related to the sequence of selection of the conferees by said originating conferee, reading out the identity of each conferee stored in each memory cell of the group associated with a given conferee during the time slot which is assigned to the terminal for said given conferee, connecting the signals from each of the terminals identified by the information stored in a group of memory cells to a different conference highway during such time slot, connecting the signals on said conference highways to a common output highway, and connecting each conferee to said output highway only during his assigned time slot.

19. A method of establishing a conference call between the terminals of conferees in a TDM conferencing system having conference highways comprising the steps of assigning each terminal for connection to a conference highway in its own discrete time slot, storing information as to the identity of a first conferee other than the originating conferee in a first memory cell of a first predetermined group of memory cells associated with the assigned time slot for the terminal of the originating conferee and storing the identity of further conferees in further memory cells in such group, storing information as to the identity of each conferee in a second group of memory cells associated with the assigned time slot for the terminal of the first conferee, the identity of the originating conferee being stored in the first memory cell and identity of each of the further conferees, as selected, being stored in successive memory cells of said second group, storing information as to the identity of each conferee in a third group of memory cells associated with the assigned time slot for the terminal of a second conferee, the identity of the first conferee being stored in the first memory cell of said third group, the identity of the originating conferee being stored in the second memory cell of said third group, and the address of the further chosen conferees being stored in the successive memory cells of the third group, reading out the identity of each conference stored in each memory cell of the group associated with a given conferee during the time slot which is assigned to the terminal for said given conferee, connecting the signals from each of the terminals identified by the information stored in a group of memory cells to a different conference highway during such time slot, connecting the signals on said conference highways to a common output highway, and connecting each conferee to said output highway only during his assigned time slot.

20. A method of establishing a conference call between the terminals of conferees in a TDM conferencing system having conference highways comprising the steps of assigning each terminal for connection to one of the highways in its own discrete time slot, storing information as to the identity of each conferee to be included in a conference call in a first predetermined group of memory cells associated with the assigned time slot for the terminal of the originating conferee, the identity of the first conferee other than the originating conferee being stored in the first memory cell, and the identity of each successive conferee being stored in successive memory cells of said first given group, storing information as to the identity of each conferee in a second group of memory cells associated with the assigned time slot for the terminals of a first conferee by placing the identity of the originating conferee in the first memory cell and as each new conferee is selected, shifing the identity of the originating conferee one memory cell and placing the identity of such further conferee in the memory cell which previously stored said originating conferee, reading out the identity of each conferee stored in each memory cell of the group associated with the assigned time slot of a terminal for a given conferee during the time slot which is assigned to the terminal for said given conferee, connecting the signals from each of the terminals identified by the information stored in a group of memory cells to a different conference highway during such time slot, connecting the signals on said conference highways to a common output highway, and connecting each conferee to said output highway only during his assigned time slot.

* * * * *

UNITED STATES PATENT AND TRADEMARK OFFICE

CERTIFICATE OF CORRECTION

PATENT NO. : 3,903,372

DATED : September 2, 1975

INVENTOR(S) : Enn Aro

It is certified that error appears in the above-identified patent and that said Letters Patent are hereby corrected as shown below:

Column 16, line 42, before "said conference" change "of" to -- to --.

Signed and Sealed this

*tenth* Day of *February 1976*

[SEAL]

*Attest:*

RUTH C. MASON
*Attesting Officer*

C. MARSHALL DANN
*Commissioner of Patents and Trademarks*